US008828175B2

(12) United States Patent
Roy

(10) Patent No.: US 8,828,175 B2
(45) Date of Patent: Sep. 9, 2014

(54) METHOD OF FABRICATING A COMPOSITE ENGINEERED WOOD MATERIAL PIECE

(76) Inventor: François Roy, Saint-Georges (CA)

(*) Notice: Subject to any disclaimer, the term of this patent is extended or adjusted under 35 U.S.C. 154(b) by 0 days.

(21) Appl. No.: 13/412,656

(22) Filed: Mar. 6, 2012

(65) Prior Publication Data

US 2012/0168067 A1 Jul. 5, 2012

Related U.S. Application Data

(62) Division of application No. 12/264,962, filed on Nov. 5, 2008, now abandoned.

(51) Int. Cl.
*B32B 37/00* (2006.01)
*B32B 38/04* (2006.01)
*B32B 38/10* (2006.01)
*B32B 37/12* (2006.01)

(52) U.S. Cl.
CPC .............. *B32B 38/10* (2013.01); *B32B 37/12* (2013.01); *B32B 2317/16* (2013.01)
USPC .......................................... 156/268; 156/257

(58) Field of Classification Search
USPC .......... 156/256, 257, 268, 259; 144/346, 355, 144/367, 368, 371, 379
See application file for complete search history.

(56) References Cited

U.S. PATENT DOCUMENTS

| | | | |
|---|---|---|---|
| 3,287,203 A | 11/1966 | Elmendorf | |
| 3,908,053 A | 9/1975 | Hettich | |
| 4,084,996 A * | 4/1978 | Wheeler | 156/257 |
| 4,086,382 A * | 4/1978 | Hites | 428/168 |
| 5,109,898 A * | 5/1992 | Schacht | 144/350 |
| 5,283,102 A | 2/1994 | Sweet et al. | |
| 5,736,227 A | 4/1998 | Sweet et al. | |
| 5,804,019 A | 9/1998 | Sweet et al. | |
| 5,816,304 A | 10/1998 | Smith | |
| 5,830,549 A | 11/1998 | Sweet et al. | |
| 5,894,700 A | 4/1999 | Sweet | |
| 5,900,099 A | 5/1999 | Sweet et al. | |
| 5,935,668 A | 8/1999 | Smith | |
| 6,156,402 A | 12/2000 | Smith | |
| 6,695,944 B2 * | 2/2004 | Courtney | 156/252 |
| 7,152,379 B2 | 12/2006 | Lin et al. | |
| 7,225,591 B2 | 6/2007 | Lin et al. | |
| 2006/0177633 A1 | 8/2006 | Han et al. | |
| 2007/0116931 A1 | 5/2007 | Lu | |

OTHER PUBLICATIONS

Brochure: "Mirage, Commercial collection, Engineered Prefinished Hardwood Floors", BOA-FRANC INC., www.miragefloors.com, Jan. 2004.

(Continued)

*Primary Examiner* — Linda L Gray
(74) *Attorney, Agent, or Firm* — Norton Rose Fulbright Canada LLP

(57) ABSTRACT

A composite engineered wood material piece and its method of fabrication is described. The wood material piece comprises a top wood layer secured to a substrate layer by a binder. The substrate layer has a plurality of grooves formed therein from a bottom surface thereof to enhance the flexibility of the wood material piece. The grooves are spaced from one another by one or more predetermined spaced intervals and have one or more predetermined depth and width calculated to substantially eliminate the effects of telegraphy of the grooves on a top finished surface of the top wood layer.

6 Claims, 2 Drawing Sheets

(56) References Cited

OTHER PUBLICATIONS

Brochure: "Mirage, Classic collection, Solid Prefinished Hardwood Floors", BOA-FRANC INC., www.miragefloors.com, Jan. 2004.
Brochure: "Mirage, Commercial collection, Engineered Prefinished Hardwood Floors", BOA-FRANC INC., www.miragefloors.com, Feb. 2004.
Brochure: "Mirage, Prefinished Hardwood Floors", BOA-FRANCE INC., www.miragefloors.com, Dec. 2003.
Brochure: "Mirage, Engineered Prefinished Hardwood Floors", BOA-FRANCE INC., www.miragefloors.com, Jan. 2007.

* cited by examiner

METHOD OF FABRICATING A COMPOSITE ENGINEERED WOOD MATERIAL PIECE

CROSS-REFERENCE TO RELATED APPLICATION

This application is a divisional of application Ser. No. 12/264,962, filed Nov. 5, 2008 now abandoned.

TECHNICAL FIELD

The present invention relates to a method of fabricating a composite engineered wood material piece. The wood material piece has a top wood layer secured to a substrate layer provided with the grooves which are sized and oriented such as to substantially eliminate the effects of telegraphy in the top finished surface of the top wood layer.

BACKGROUND ART

It is well known in the prior art to fabricate wood boards, particularly for the construction of wood floors, wherein the wood boards are formed from solid wood or laminated wood which contains grooves in the back surface thereof whereby to enhance the flexibility of the boards. It is also known to fabricate wood flooring strips having small wooden slats glued to the backside thereof at regular spaced intervals to add additional flexibility to the floor board. The desired flexibility of floor boards is that they can conform to irregularities in the subfloor to which the boards are to be secured. Generally these floor boards are of thicknesses of ½ inch (12.5 mm) up to about 1 inch (25.4 mm) and provided with tongue and grooves whereby to engage one another in a side-by-side and end-to-end relationship. Such boards and the disadvantages of the related prior art are discussed for example in U.S. Pat. No. 5,283,102 issued on Feb. 1, 1994.

In recent years, laminated wood boards have become thinner with the top solid wood layer also becoming thinner normally in the range of about ⅛ inch (3.1 mm) and such laminated wood boards are installed directly on a solid wood floor or on a sound absorbing material secured to the subfloor. Transverse grooves are formed in the substrate layer of these laminated boards to provide the desired flexibility of the boards to facilitate installation thereof. However, because the top wood layer is relatively thin as compared to the substrate layer to which it is secured, the grooves formed in the substrate layer become visible in the top surface of the top wood layer by the phenomenon of telegraphy. Accordingly, the grooves need to be made very shallow and the top surface of the top wood layer is preferably of light tone or provided with a non-lustre varnish in an attempt to try to conceal the appearance or reflection of these grooves in the top surface. Therefore, laminated products have been constructed with the top wood layer having a thickness ratio in the range of one-to-one with respect to the substrate and thus affecting the flexibility of the wood board and increasing the cost thereof.

SUMMARY OF THE INVENTION

It is a feature of the present invention to provide a method of fabrication of a composite engineered wood material piece which substantially overcomes the above-mentioned disadvantages of telegraphy.

According to a broad aspect of the present invention, there is provided a method of fabricating a composite engineered wood material piece having a top wood layer secured to a substrate layer by binding means. The method comprises the steps of calculating from known parameters of the top wood layer and substrate layer, the depth, width and spacing of the grooves to be formed in a bottom surface of the substrate layer to enhance the flexibility of the wood material layer while substantially eliminating the effects of telegraphy of the grooves on a top finished surface of the top wood layer. The method further comprises forming a plurality of grooves in the bottom surface of the substrate layer having dimensions and spacing as calculated from the known parameters.

According to a further broad aspect, the predetermined depth and width and spacing of the grooves, in accordance with the present invention, are effected by the analysis of the following parameters: a) the type of wood of the top wood layer, b) the intrinsic properties of the substrate layer, c) the thickness ratio between the top wood layer and the substrate layer, d) the top surface texture of the top wood layer, e) the properties of the binding means, and f) the type of finish coating to be applied to a top surface of the top wood layer.

According to a still further broad aspect of the present invention there is provided a method of fabricating a composite engineered flexible floor board having a top wood layer secured to a wood material substrate layer by binding means and wherein the top wood layer is of superior wood material than that of the wood material substrate layer. The method comprising calculating from known parameters of the top wood layer and wood material substrate layer the depth, width and spacing of grooves to be formed in a bottom surface of the wood material substrate layer to enhance the flexibility of the flexible floor board while substantially eliminating the visibility of the grooves on a top finished surface of the top wood layer due to the effects of telegraphy. The method further comprises forming a plurality of grooves in the bottom surface of the wood material substrate layer having dimensions and spacing as calculated by the previous step.

BRIEF DESCRIPTION OF THE DRAWINGS

A preferred embodiment of the present invention will now be described with reference to the accompanying drawings in which.

DESCRIPTION OF PREFERRED EMBODIMENTS

Figure 1:
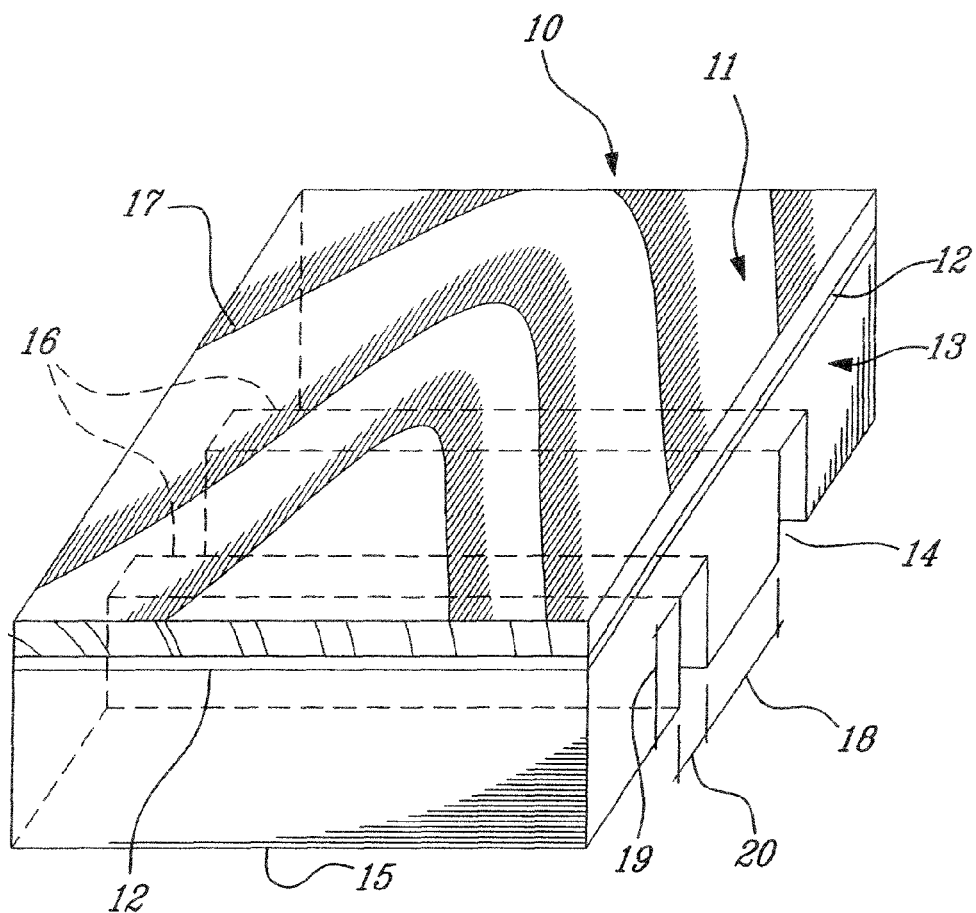
FIG. 1 is a fragmented perspective view of a section of a composite engineered wood material piece constructed in accordance with the present invention.

Referring now to the drawings and more particularly to FIG. 1, there is shown generally at 10 a composite engineered wood material piece such as a floor board or slats constructed in accordance with the prior art and which comprises a top wood layer constructed of a superior material such as oak, pine or maple and secured by a glue layer 12 to a substrate layer 13. Grooves 14 are formed in the substrate material 13 from a bottom surface 15 thereof and at spaced intervals whereby to provide flexibility to the floor board 10. As previously described, such grooves 14, through the phenomenon of telegraphy, form shaded zones 16 in the top finished surface 17 of the top wood layer 11.

The present invention addresses this phenomenon of telegraphy and substantially eliminates the effects thereof on the top finished surface 17. This is achieved by calculating the dimension of the depth and width as well as the spacing of the grooves from a set of parameters of the top wood layer and the substrate layer. These parameters include the type of wood of the top wood layer, the intrinsic properties of the substrate layer, the thickness ratio between the top wood layer and the substrate layer, the top surface texture of the top wood layer, the properties of the binding means and the type of finish coating to be applied to a top surface of the top wood layer. All of these parameters have an interrelationship with respect to one another and produce the resulting telegraphy. It has been ascertained that this telegraphy is caused by four phenomenon and namely the induced tension within the composite laminated material piece, the deformation of the composite material piece caused by deflection when it is installed on a irregular subsurface, the change in humidity in the composite material piece causing it to expand and retract, and the dispersion or conduction of humidity throughout the composite wood material piece.

Because the composite engineered wood material piece of the present invention is comprised of two distinct laminated wood materials, namely a top wood layer 11 of wood material and a substrate layer comprised of laminated or compressed inferior wood material glued together or other suitable type of substrate, these glued materials will be subject to tension and stress which will produce the telegraphy of the grooves formed in the bottom surface thereof. The ratio between the thickness of the top wood layer 11 and the substrate layer 13 is an important factor in determining the spacing 18, see FIG. 1, between the grooves 14. If the ratio between the thickness of the top wood layer 11 and that of the substrate layer 13 is close to 1, the telegraphy of the grooves will be very weak due to the thickness of the top wood layer 11 which is less conductive. However, if the ratio between the top wood layer and the substrate layer is 1:10, the telegraphy would be greatly amplified as the top wood layer is very thin compared to the substrate layer. Accordingly, the spacing 18 between the grooves will require to be closer to one another and the dimension of the depth 19 of the groove would have to be shorter. The width 20 of the grooves may also be made narrower.

Example 1

If the top wood layer 11 has a thickness of 8 mm and the substrate layer 13 has a thickness of 8 mm, the telegraphy of the grooves 14 formed in the substrate layer is nearly inexistent for the reason that the substrate layer cannot have much effect on the top wood layer which is of equal thickness. However, if the top wood layer is of 1 mm thickness and the substrate layer much thicker, say 8 mm, the telegraphy of the grooves would be very visible. Therefore, the ratio between the thickness of the top wood layer and the substrate layer is an important factor to consider in the determination of the configuration and spacing of the grooves.

Example 2

Considering now two top wood layers 11, one of 2 mm and one of 4 mm, glued on a 6 mm thick substrate and with the grooves being spaced-apart 2 inches 50.8 mm) and having a depth of 4 mm. The groove telegraphy in the 2 mm top wood layer will be very visible. Accordingly, the spacing between the grooves will need to be reduced to 1 inch (25.4 mm) to reduce substantially the telegraphy. However, for the top wood layer of 4 mm a groove spacing of ½ inches (38.1 mm) would be sufficient to obtain an acceptable level of reduction of the telegraphy.

Another important factor to consider is the binding material which is preferably a glue coating applied between the top wood layer 11 and the substrate layer 13 with further application of pressure by means of presses, as is well known in the art. The adhesive material can also be polyurethane foam or contact cement applied to opposed surfaces to be mated and let dry before the layers are contacted under pressure. The adhesive binder or glue 12 has a predetermined elastic property and thickness and such is also a factor in the determination of the predetermined spacing 18 of the grooves 14. Glue which is very flexible will permit a spacing 18 between the grooves which is larger or permit a depth of groove which is deeper as the glue acts as a relaxation zone for the constraints of the substrate layer. The glue, or other binding agent, could also acts as vapour barrier and reduces the transmission of humidity.

Another important factor taken into consideration is the depth 19 of the grooves 14. The ratio between the depth 19 of the grooves 14 and the thickness of the substrate layer 13 has an impact on the telegraphy and the flexibility of the wood material piece 10. For a top layer to substrate layer ratio of 1:8 and less, the wood material piece 10 would have less flexibility and less telegraphy. Depending on the nature of the substrate layer, it has been ascertained that a certain flexibility can be achieved with a ratio of 1:3 but the telegraphy phenomenon will be increased. In order to reduce telegraphy, the spacing 18 between the grooves will be reduced as above-mentioned. It is pointed out that a ratio of 7:8 can provoke important telegraphy in the top finished surface of the top layer.

The depth 19 of the grooves also has a negative effect in that it defuses humidity within the substrate layer and can provoke increased telegraphy on the top surface 17 of the top wood layer 11. Although the glue layer 12 and the glue present in the substrate provide a barrier to humidity, this barrier is broken at each groove 14. As pointed out herein above the reason for the grooves is to diminish the rigidity of the composite material piece or layer in order to facilitate installation on irregular subsurfaces.

Example 3

Figure 2:
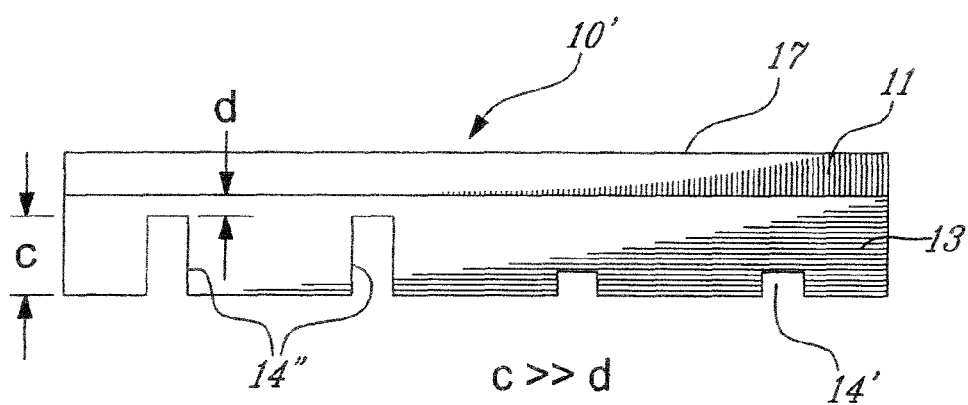
FIG. 2 is a side view of an example of a composite engineered wood material piece constructed in accordance with the present invention.

With reference to FIG. 2, there is shown a specific composite engineered wood material piece 10' constructed in accordance with the present invention. The top wood layer 11 is formed of maple wood and has a thickness of 4 mm. The substrate layer 13 is formed of birch wood and has a thickness of 9 mm. If the grooves 14' have a depth of 2 mm, the telegraphy in the top finished surface 17 is practically invisible. However, if the grooves 14" have a depth of 8 mm, for the same groove width, the telegraphy would be very visible in the top finished surface 17. However, the grooves 14' are not deep enough to provide the desired flexibility of the composite wood material piece 10.

Another important factor taken into consideration is the composition of the substrate layer 13. The intrinsic properties of the substrate layer 13 have an important effect on telegraphy. Substrate layers of material all have a specific density and modulus of elasticity and hygroscopic properties as well as other characteristics. By the formation of grooves in the substrate layer, there is created constraints in the substrate layer which are manifest on the top finished surface of the top wood layer. A substrate material which has a high hygroscopic movement will be affected substantially by the formation of grooves and would have a greater impact on the appearance of the grooves on the top surface of the top wood layer. Accordingly, rigidity of the substrate layer affects telegraphy. The tensions which exist in certain substrate materials due to their lamination and the orientation of wood particles and fibres, can also provoke telegraphy when grooves are formed in such material. As above-described, the humidity barrier characteristic of the substrate is also an important factor.

Example 4

We will now consider the effects of a top wood layer 11 having a thickness of 4 mm secured to two types of substrate layer 13, namely a substrate layer constructed of MDF material and having a thickness of 8 mm as compared to a substrate layer of the same thickness but fabricated from plywood material. During humidity variations, the MDF substrate layer will have more important dimensional instability and will provoke more telegraphy when compared to the plywood sheet substrate which has a greater dimensional stability. Thus, the composite material which has a substrate layer having a greater modulus of elasticity will provoke increased telegraphy on the finished surface of the top wood layer as there will be more deformation in the surrounding area of the grooves.

Figure 3A:
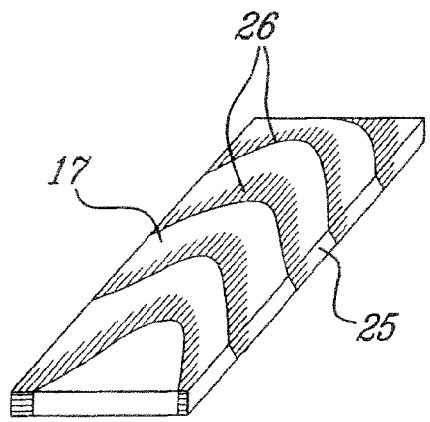
FIG. 3A is a perspective top view of a top wood layer to be secured to a substrate layer and formed of oak material having a clearly defined and visible grain surface texture.

Another factor to consider in the determination of the configuration and spacing of the grooves is the top surface texture of the top wood layer. FIG. 3A shows a top wood layer formed of oak material which is a very rigid wood material having a very high modulus of elasticity and such would therefore greatly reduce the telegraphy of the grooves. The oak wood has a pronounced textured grain 26 which also conceals defects in the top finished surface 17. When the wood material pieces are used as floor boards, one or more coats of varnish are applied to the top surface 17 for shine and durability. It has been found that a glossy surface is more conductive of the telegraphy phenomenon than is a less glossy surface. Also, if a stain is applied to the top surface of the top wood layer, the darker the stain, the more visible becomes any telegraphy and this may also be taken into consideration when calculating the size and spacing of the groove.

Example 5

Figure 3B:
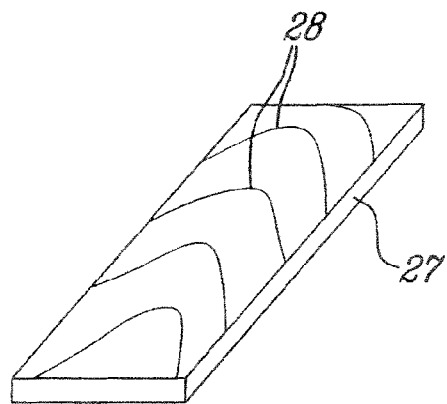
FIG. 3B is a perspective view similar to FIG. 3A but showing a top wood layer fabricated from a different type of wood, herein maple wood having a faint wood grain.

As described above with reference to FIGS. 3A and 3B, there is shown the oak material top layer 25 which is darker and provided with a pronounced textured grain and a maple wood top layer 27 which is lighter and contains less grain. The maple top wood layer 27 will show more telegraphy than the oak layer. Both top wood layers 25 and 27 have a thickness of 2 mm and are secured to a same substrate layer. It has been found that the maple top wood layer produces a more important telegraphy than does the oak layer 25. Also, the textured grain 28 in the maple wood 27 is less pronounced and visible and therefore provides less camouflage to any telegraphy transmission in the wood material.

Example 6

Considering now a top wood layer of oak material having a natural colour with a mat finish on its top surface as opposed to a top wood layer of maple which is stained a dark color and provided with a high lustred finish on its top surface. Both top wood layers are 4 mm in thickness and are glued onto a substrate layer formed of birch and having a thickness of 9 mm and grooves having a depth of 6 mm and a width of 2 mm. The grooves are also spaced apart 1½ inch. When comparing both products it has been found that the oak material top layer provides an adequate reduction of the telegraphy of the grooves on its top surface. Accordingly, it would be possible to utilize a glue which is less flexible or to have the grooves spaced a greater distance apart, about 1½ inches. However, with the dark stain maple wood top layer, the telegraphy was slightly apparent. Therefore, a reduction in the spacing between the grooves would be necessary to greatly reduce this telegraphy, a spacing of 1⅛ inch.

In conclusion, the finish coating applied to the top surface of the top wood layer 11 has an impact on telegraphy. A finished coating which has less lustre will produce less telegraphy than does a high lustre surface as above-mentioned. However, high lustre surfaces are the preferred surfaces of floor wood board, furniture, wall decorations, etc., and accordingly, it is important to therefore configure the grooves such as to substantially eliminate or greatly reduce the telegraphy phenomenon.

A further factor for consideration is the determination of the width 20 of the grooves 14. A very narrow groove width produces very little telegraphy. For the laminated wood boards as above-described, it has been found that a width of 1 to 2 mm provokes an average telegraphy whereas a width which is greater than 3 mm or more than 4 mm will enhance telegraphy. There is therefore a proportional relationship between the transmission of telegraphy and the groove width.

As mentioned, another consideration in reducing telegraphy is the spacing 18 between the grooves. Generally speaking, a spacing of more than 2 inches 50.8 mm) greatly increases telegraphy depending of course on the depth and width of the grooves. A spacing of 1¼ inches or less will improve the reduction of telegraphy and it has been found that a spacing of about one inch is more desirable as it further reduces telegraphy. However, the amount of grooves should be limited not to greatly affect the modulus of elasticity of the substrate material.

Example 7

For a composite material piece having a substrate layer formed of birch material and of a thickness of 9 mm, and a top surface layer of maple having a thickness of 4 mm with a glossy surface coating, grooves having a width of 2 mm and a depth of 6 mm would be desirable. However, with such a product specification, the risk of telegraphy is highly present as we have a ratio of thickness between the top wood layer and the substrate layer of 4:9, a ratio of groove depth of 6:9, a rigid modulus of elasticity of the substrate, and a glossy top surface finish on the top surface layer. Also, any humidity will provoke deformation in the wood material. Therefore, a spacing between the grooves of 2 inches (50.8 mm) will make the grooves very visible on the top surface by telegraphy. By decreasing the spacing to about 1⅛ inch, the telegraphy is practically non-visible and the grain in the top maple wood layer becomes more visible due to the practically non-existing phenomenon of the telegraphy. By reducing the spacing between the grooves to about 1 inch (25.4 mm), the grain becomes more visible and the surface is almost unaffected by telegraphy.

Figure 4:
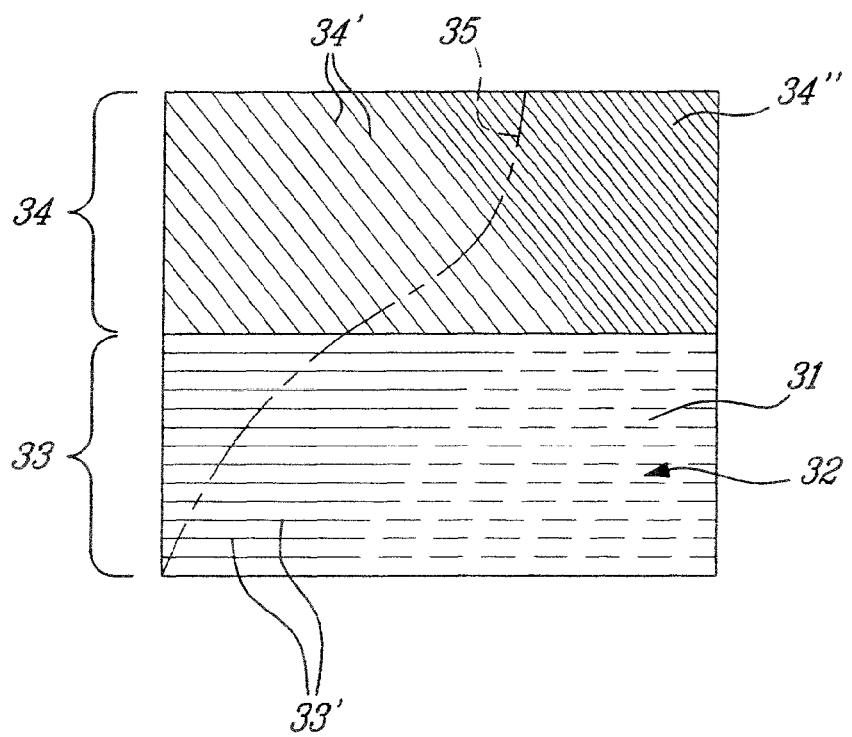
FIG. 4 is a plan view of the rear surface of a composite engineered wood material piece having grooves therein formed of different spacing, size and orientation to provide a sheet adapted to be cut to a template shape to produce a contoured sheet having different flexible regional characteristics to form a top surface of a shaped member, such as an article of furniture, an irregularly shaped wall surface or a multitude of other articles.

Referring now to FIG. 4, there is shown a composite engineered wood material piece, herein a sheet of material, formed in accordance with the present invention. As hereinshown, the rear surface 31 of the substrate layer 32 is provided with grooves oriented in groups, namely groups 33 and 34 and wherein the orientation of the grooves 33' of group 33 and grooves 34' of Group 34 extend at different angles whereby to provide different zones and orientation of flexibility to the layer. Also, the grooves 34" in group 34 are more closely spaced in a section of the group 34 to provide added flexibility in that section. Such an engineered composite layer may be formed for specific applications and wherein the layer may be cut to the shape of a template, such as indicated by phantom line 35, to form an overlay sheet for a repetitive product, such as an article of furniture wherein the sheet is to be bent to conform to a certain shape. The spacing and dimension of the grooves is also calculated to substantially eliminate or greatly reduce the phenomenon of telegraphy. It is pointed out that the grooves can be formed by various means, such as by the use of a saw, a router bit, a slitting blade, or by spaces between glued material strips.

It is within the ambit of the present invention to cover any obvious modifications of the preferred embodiment described herein, provided such modifications fall within the scope of the appended claims.

I claim:

1. A method of fabricating a composite engineered wood material floor board comprised of a top wood layer secured to a wood material substrate layer by an adhesive binder, said method comprising the steps of:
   i) selecting a top wood layer from a top surface quality wood material having a thickness of between 1 mm to 8 mm,
   ii) selecting a substrate wood material layer having a thickness of between 6 mm and a thickness ratio of 1 to no more than 10 between the top wood layer and the substrate wood material layer, and wherein for a thickness ratio of 1:8 between said top wood layer to said substrate wood material layer said floor board produces less telegraphy and for a thickness ratio of 7:8 between said top wood layer to said substrate wood material layer more visible telegraphy would be present in a top finished surface of said wood layer,
   iii) bonding said top wood layer to said substrate wood material substrate layer by said adhesive binder, and
   iv) forming a plurality of transverse rectangular spaced-apart grooves in a bottom surface of said wood substrate layer with said grooves extending transverse to said top wood layer and the top wood layer grain direction, said grooves defining opposed, spaced parallel side walls and a flat bottom wall; the ratio between the depth of said grooves and the thickness of said substrate wood material layer having an impact on telegraphy of said grooves in said top wood layer; said grooves having a width of between 1 mm to 4 mm, said grooves being spaced-apart by a distance of 25.4 mm to 50.8 mm, and wherein said grooves enhance the flexibility of said composite engineered wood material piece while substantially eliminating the effects of telegraphy of said grooves on a top finished surface of said top wood layer.

2. A method as claimed in claim 1 wherein said step (iv) comprises forming said grooves by one of the use of a saw blade, a routing bit, or a slitting blade.

3. A method as claimed in claim 1 wherein prior to step (i) there is provided the step of selecting said wood material substrate layer from one of laminated wood, MDF wood, or a composite wood product.

4. A method as claimed in claim 1 wherein said adhesive binder has an elastic property.

5. A method as claimed in claim 1 wherein there is further provided the step of applying a stain and finish coating to an outer surface of said top surface wood material to form a top finished surface.

6. A method as claimed in claim 1 wherein said width of said grooves is in the range of 1 mm to 2 mm.

* * * * *